US011903060B2

(12) United States Patent
Zhang et al.

(10) Patent No.: US 11,903,060 B2
(45) Date of Patent: Feb. 13, 2024

(54) USER INTERFACE (UI) DISPLAY CONTROL METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Tao Zhang, Guangdong (CN); Yang Xia, Guangdong (CN); Kai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 494 days.

(21) Appl. No.: 17/176,004

(22) Filed: Feb. 15, 2021

(65) Prior Publication Data

US 2021/0168887 A1    Jun. 3, 2021

Related U.S. Application Data

(63) Continuation of application No. PCT/CN2019/102845, filed on Aug. 27, 2019.

(30) Foreign Application Priority Data

Sep. 4, 2018 (CN) .......................... 201811028379.1

(51) Int. Cl.
*H04W 88/06* (2009.01)
*H04W 76/15* (2018.01)
(Continued)

(52) U.S. Cl.
CPC ............ *H04W 76/15* (2018.02); *G06F 9/451* (2018.02); *H04L 1/0025* (2013.01); *H04W 88/06* (2013.01)

(58) Field of Classification Search
CPC ...... H04W 76/15; H04W 88/06; H04L 1/0025
See application file for complete search history.

(56) References Cited

U.S. PATENT DOCUMENTS

| 11,382,157 B2 * | 7/2022 | Haberman | ............ H04W 76/38 |
| 11,665,631 B2 * | 5/2023 | Gao | ...................... H04W 48/16 370/329 |

(Continued)

FOREIGN PATENT DOCUMENTS

| CN | 104468050 A | 3/2015 |
| CN | 105210438 A | 12/2015 |

(Continued)

OTHER PUBLICATIONS

Extended European Search Report for EP Application 19858120.9 dated Sep. 24, 2021. (55 pages).

(Continued)

*Primary Examiner* — Barry W Taylor
(74) *Attorney, Agent, or Firm* — Young Basile Hanlon & MacFarlane, P.C.

(57) ABSTRACT

Disclosed are a user interface (UI) display control method and apparatus. The method comprises: determining a data packet size of a data packet to be transmitted when a data packet transmission instruction is received; determining a transmission policy for the data packet to be transmitted according to the data packet size; determining a network identifier adapted to the transmission policy; and displaying the network identifier on a user interface (UI). The present application is beneficial to improve the comprehensiveness and accuracy of a network identifier of an electronic device in a data packet transmission scenario.

20 Claims, 5 Drawing Sheets

(51) Int. Cl.
*G06F 9/451* (2018.01)
*H04L 1/00* (2006.01)

(56) References Cited

U.S. PATENT DOCUMENTS

| | | | |
|---|---|---|---|
| 2006/0062149 A1* | 3/2006 | Bednasz | H04L 67/75 370/235 |
| 2015/0215945 A1 | 7/2015 | Hsu et al. | |
| 2019/0069229 A1* | 2/2019 | Lee | H04W 88/06 |
| 2019/0349906 A1* | 11/2019 | Futaki | H04W 36/14 |
| 2020/0037387 A1* | 1/2020 | Lee | H04W 36/0069 |
| 2020/0045762 A1* | 2/2020 | Raghuram | H04W 76/16 |
| 2022/0159569 A1* | 5/2022 | Yuan | H04W 52/0229 |

FOREIGN PATENT DOCUMENTS

| | | |
|---|---|---|
| CN | 105792286 A | 7/2016 |
| CN | 107197507 A | 9/2017 |
| CN | 107517482 A | 12/2017 |
| CN | 107889227 A | 4/2018 |
| CN | 103875265 B | 5/2018 |
| GB | 2563590 A | 12/2018 |
| WO | 2017195471 A1 | 11/2017 |

OTHER PUBLICATIONS

Kibria et al., Next Generation New Radio Small Cell Enhancement: Architectural Options, Functionality and Performance Aspects, IEEE Wireless Communications, Aug. 2018. (pp. 120-128).
Communication pursuant to Article 94(3) EPC for EP Application 19858120.9 dated Apr. 26, 2023. (5 pages).
Chinese Second Office Action with English Translation for CN Application 201980044822.0 dated Jun. 20, 2023. (16 pages).
Chinese First office action with English Translation for Application No. 201980044822.0, dated Nov. 18, 2022 (20 pages).
International Search Report with English Translation of International application No. PCT/CN2019/102845 dated Nov. 2, 11.2019 (13 pages).
Consideration on the GSMANR indication requirements, 3GPP TSG-RAN WG2 Meeting #101R2-1803664, Published on Mar. 2, 2018 (3 pages).
Inter RAT Tight Interworking, 3GPP TSG RAN WG3 meeting #92 R3-161188, Published on May 27, 2016 (2 pages).

* cited by examiner

USER INTERFACE (UI) DISPLAY CONTROL METHOD, ELECTRONIC DEVICE, AND STORAGE MEDIUM

CROSS-REFERENCE TO RELATED APPLICATION(S)

The present disclosure is a continuation-application of International (PCT) Patent Application No. PCT/CN2019/102845 filed on Aug. 27, 2019, which claims foreign priority of Chinese Patent Application No. 201811028379.1, filed on Sep. 4, 2018, the entire contents of both of which are hereby incorporated by reference.

TECHNICAL FIELD

The present application relates to the technical field of mobile communication, and in particular, to a user interface (UI) display control method, an electronic device, and a storage medium.

BACKGROUND

With continuous development of mobile communication networks, mobile communication networks have gradually evolved from fourth generation (4G) mobile communication networks to fifth generation (5th Generation, 5G) mobile communication networks. In the evolution process of mobile communication networks, evolution progresses of access networks (Radio Access Network, RAN), core networks (Core Network, CN), and terminals are relatively independent. In a non-independent network (Non-Stand Alone, Under the NSA) architecture, a terminal can access a 5G core network through a 4G access network and a 5G access network. How does the terminal determine an access network type of a current service and correctly display the access network type of the current service through its own UI is a problem to be solved.

SUMMARY

In a first aspect, an embodiment of the present application provides a user interface (UI) display control method applied in an electronic device; wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the method comprises: determining a data packet size of a data packet to be transmitted in response to receiving a data packet transmission instruction; determining a transmission mode for the data packet to be transmitted according to the data packet size; determining a network identifier corresponding to the transmission mode; and displaying the network identifier on a user interface (UI).

In a second aspect, an embodiment of the present application provides an electronic device comprising a processor, a memory, a communication interface, and one or more program; wherein, the one or more program is stored in the memory and configured to be executed by the processor, and the program comprises instructions configured to execute operations of any method of the first aspect of the embodiment of the present application.

In a third aspect, an embodiment of the present application provides a non-transitory computer readable storage medium, wherein the non-transitory computer readable storage medium stores a computer program configured for electronic data exchange, wherein the computer program enables a computer to execute some or all operations described in any method of the first aspect of the embodiment of the present application.

BRIEF DESCRIPTION OF DRAWINGS

In order to describe technical solutions in embodiments of the present application or in the prior art more clearly, drawings required being used in description of the embodiments or the prior art will be simply introduced below. Obviously, the drawings in the following description are merely some embodiments of the present application. For one of ordinary skill in the art, it is also possible to obtain other drawings according to these drawings without paying any creative work.

DETAILED DESCRIPTION

Figure 1A:
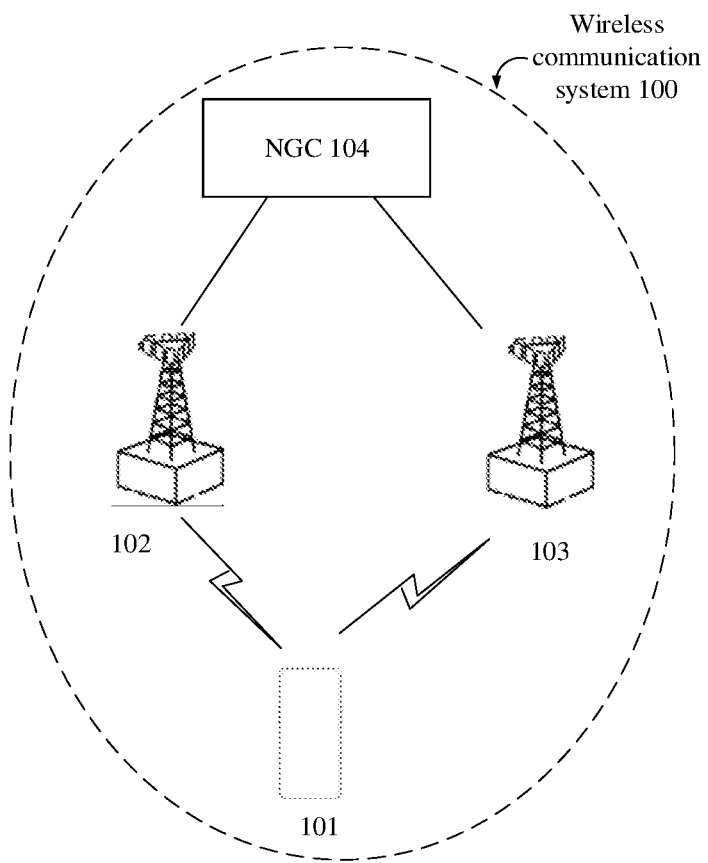
FIG. 1A is an exemplary architecture diagram of a wireless communication system provided by an embodiment of the present application.

In order to make those skilled in the art better understand solutions of the present application, technical solutions in embodiments of the present application will be described clearly and completely below in accompany with drawings in embodiments of the present application. Obviously, the described embodiments are merely some embodiments of the present application, but not all embodiments. Based on embodiments of the present application, all other embodiments obtained by one of ordinary skill in the art without paying any creative work belong to the protection scope of the present application.

The terms "first", "second", and the like in the specification and claims of the present application and the above-mentioned drawings are used to distinguish different objects, but not used to describe a specific order. In addition, the terms "include" and "have" and any variations of them are intended to cover non-exclusive inclusion. For example, a process, a method, a system, a product, or a device that includes a series of steps or units is not limited to those steps or units that have been listed, but may optionally also include steps or units that are not listed, or may optionally also include other steps or units inherent to these processes, methods, products, or devices.

Reference to "an embodiment" herein is that particular features, structures, or characteristics described in connection with embodiments may be included in at least one embodiment of the present application. Appearances of this phrase in various places in the specification are not necessarily all referring to the same embodiment, nor are they independent or alternative embodiments that are mutually exclusive with other embodiments. It is explicitly and implicitly understood by those skilled in the art that the embodiments described herein may be combined with other embodiments.

Electronic devices involved in embodiments of the present application can be electronic devices having data transmission capability. The electronic devices may include various handheld devices, vehicle-mounted devices, wearable devices, and computing devices with wireless communication functions, or other processing devices connected to wireless modems, and various forms of user equipments (UE), mobile stations (MS), terminal devices, and so on. Embodiments of the present application are introduced in detail below.

In a first aspect of the present disclosure, a user interface (UI) display control method applied in an electronic device is provided; wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the method comprises: determining a data packet size of a data packet to be transmitted in response to receiving a data packet transmission instruction; determining a transmission mode for the data packet to be transmitted according to the data packet size; determining a network identifier corresponding to the transmission mode; and displaying the network identifier on a user interface (UI).

In some embodiments, the determining a transmission mode for the data packet to be transmitted according to the data packet size comprises: determining a transmission time threshold value of the data packet to be transmitted; and determining that a transmission mode for the data packet to be transmitted is a first transmission mode in response to detecting that the data packet size is less than a first threshold value, wherein the first transmission mode is transmitting the data packet to be transmitted to the NGC through the first communication connection and the fourth communication connection within the transmission time threshold value.

In some embodiments, the determining a transmission mode for the data packet to be transmitted according to the data packet size comprises: determining a transmission time threshold value of the data packet to be transmitted; and determining that a transmission mode for the data packet to be transmitted is a second transmission mode in response to detecting that the data packet size is greater than a second threshold value, wherein the second transmission mode is transmitting the data packet to be transmitted to the NGC through the second communication connection and the fifth communication connection within the transmission time threshold value; wherein the second threshold value is greater than the first threshold value.

In some embodiments, the determining a transmission mode for the data packet to be transmitted according to the data packet size comprises: determining a transmission time threshold value of the data packet to be transmitted; splitting the data packet to be transmitted into a first data packet and a second data packet in response to detecting that the data packet size is greater than the first threshold value but less than the second threshold value; and determining that a transmission mode for the data packet to be transmitted is a third transmission mode, wherein the third transmission mode is transmitting the first data packet to the NGC through the first communication connection and the fourth communication connection and transmitting the second data packet to the NGC through the second communication connection and the fifth communication connection within the transmission time threshold value.

In some embodiments, the splitting the data packet to be transmitted into a first data packet and a second data packet comprises: obtaining a first data transmission speed corresponding to the first communication connection and a second data transmission speed corresponding to the second communication connection; determining a ratio of the first data transmission speed to the second data transmission speed; and splitting the data packet to be transmitted into a first data packet and a second data packet according to the ratio, wherein the first data packet corresponds to the first data transmission speed, and the second data packet corresponds to the second data transmission speed.

In some embodiments, the determining a network identifier corresponding to the transmission mode comprises: determining that a first network identifier corresponds to the first transmission mode, a second network identifier corresponds to the second transmission mode, and a first network identifier or a second network identifier corresponds to the third transmission mode.

In some embodiments, the first network identifier is a 4G network identifier, and the second network identifier is a 5G network identifier.

In some embodiments, the determining that the first network identifier or the second network identifier corresponds to the third transmission mode comprises: determining a size of the first data packet and a size of the second data packet; determining that the first network identifier corresponds to the third transmission mode in response to detecting that the size of the first data packet is greater than the size of the second data packet; or determining that the second network identifier corresponds to the third transmission mode in response to detecting that the size of the first data packet is less than the size of the second data packet.

In some embodiments, the data packet to be transmitted is a game data packet, and the user interface (UI) is a game group battle interface; the displaying the network identifier on a user interface (UI) comprises: labeling the first network identifier with a first sign in response to detecting that the network identifier is the first network identifier; and labeling the second network identifier with a second sign in response to detecting that the network identifier is the second network identifier.

In some embodiments, the data packet to be transmitted is a game data packet, and the user interface (UI) is a game application interface; the displaying the network identifier on a user interface (UI) comprises: inquiring a preset correspondence relationship between a game application interface and a network identifier displaying position; determining a target displaying position for the network identifier corresponding to the user interface (UI) according to the preset correspondence relationship; and displaying the network identifier on the target displaying position.

In a second aspect of the present disclosure, an electronic device is provided, wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the electronic device comprises a processor, a memory, a communication interface, and one or more program; wherein, the one or more program is stored in the memory and configured to be executed by the processor, and the program comprises instructions configured to execute the following operations: determining a data packet size of a data packet to be transmitted in response to receiving a data packet transmission instruction; determining a transmission mode for the data packet to be transmitted according to the data packet size; determining a network identifier corresponding to the transmission mode; and displaying the network identifier on a user interface (UI).

In some embodiments, the determining a transmission mode for the data packet to be transmitted according to the data packet size comprises: determining a transmission time threshold value of the data packet to be transmitted; and determining that a transmission mode for the data packet to be transmitted is a first transmission mode in response to detecting that the data packet size is less than a first threshold value, wherein the first transmission mode is transmitting the data packet to be transmitted to the NGC through the first communication connection and the fourth communication connection within the transmission time threshold value.

In some embodiments, the determining a transmission mode for the data packet to be transmitted according to the data packet size comprises: determining a transmission time threshold value of the data packet to be transmitted; and determining that a transmission mode for the data packet to be transmitted is a second transmission mode in response to detecting that the data packet size is greater than a second threshold value, wherein the second transmission mode is transmitting the data packet to be transmitted to the NGC through the second communication connection and the fifth communication connection within the transmission time threshold value; wherein the second threshold value is greater than the first threshold value.

In some embodiments, the determining a transmission mode for the data packet to be transmitted according to the data packet size comprises: determining a transmission time threshold value of the data packet to be transmitted; splitting the data packet to be transmitted into a first data packet and a second data packet in response to detecting that the data packet size is greater than the first threshold value but less than the second threshold value; and determining that a transmission mode for the data packet to be transmitted is a third transmission mode, wherein the third transmission mode is transmitting the first data packet to the NGC through the first communication connection and the fourth communication connection and transmitting the second data packet to the NGC through the second communication connection and the fifth communication connection within the transmission time threshold value.

In some embodiments, the splitting the data packet to be transmitted into a first data packet and a second data packet comprises: obtaining a first data transmission speed corresponding to the first communication connection and a second data transmission speed corresponding to the second communication connection; determining a ratio of the first data transmission speed to the second data transmission speed; and splitting the data packet to be transmitted into a first data packet and a second data packet according to the ratio, wherein the first data packet corresponds to the first data transmission speed, and the second data packet corresponds to the second data transmission speed.

In some embodiments, the determining a network identifier corresponding to the transmission mode comprises: determining that a first network identifier corresponds to the first transmission mode, a second network identifier corresponds to the second transmission mode, and a first network identifier or a second network identifier corresponds to the third transmission mode.

In some embodiments, the first network identifier is a 4G network identifier, and the second network identifier is a 5G network identifier.

In some embodiments, the determining that the first network identifier or the second network identifier corresponds to the third transmission mode comprises: determining a size of the first data packet and a size of the second data packet; determining that the first network identifier corresponds to the third transmission mode in response to detecting that the size of the first data packet is greater than the size of the second data packet; or determining that the second network identifier corresponds to the third transmission mode in response to detecting that the size of the first data packet is less than the size of the second data packet.

In some embodiments, the data packet to be transmitted is a game data packet, and the user interface (UI) is a game group battle interface; the displaying the network identifier on a user interface (UI) comprises: labeling the first network identifier with a first sign in response to detecting that the network identifier is the first network identifier; and labeling the second network identifier with a second sign in response to detecting that the network identifier is the second network identifier.

In a third aspect of the present disclosure, a non-transitory computer readable storage medium is provided, wherein the non-transitory computer readable storage medium stores a computer program configured for electronic data exchange, wherein the computer program enables a computer to execute a user interface (UI) display control method applied in an electronic device; wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the method comprises: determining a data packet size of a data packet to be transmitted in response to receiving a data packet transmission instruction; determining a transmission mode for the data packet to be transmitted according to the data packet size; determining a network identifier corresponding to the transmission mode; and displaying the network identifier on a user interface (UI).

As shown in FIG. 1A, a network accessed by an electronic device 101 described in an embodiment of the present application can be a 5G NSA network, the network specifically includes a base station 102 (4G base station eNB), a base station 103 (5G base station gNB), and a new generation core network NGC (Next Generation Core, NGC) 104, wherein a control plane signaling can be transmitted through the base station 102, and user plane data of the electronic device can be transmitted to the new generation core network NGC 104 through the base station 102 and the base station 103 respectively. The electronic device 101 specifically maintains communication connections with the base station 102 and the base station 103 at the same time through a dual connection mode to implement data packet transmission.

In order to facilitate understanding technical solutions of embodiments of the present application, relating technology of embodiments of the present application are described below.

Figure 1B:
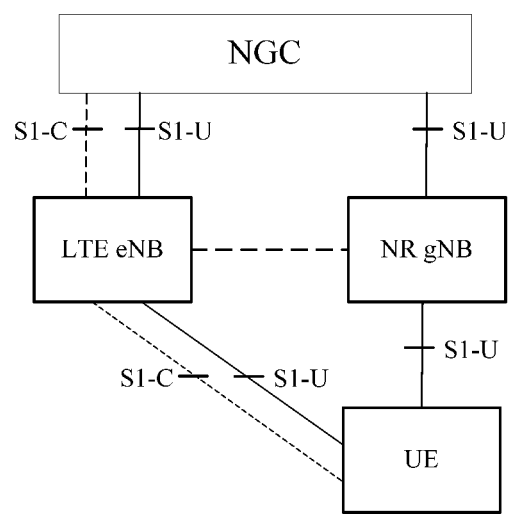
FIG. 1B is a reference schematic diagram of an Option 7a architecture provided by an embodiment of the present application.

Option7a architecture: a feature of the Option7a architecture is that a core network is the 5G core network NGC, and an access network has both a Long Term Evolution (LTE) function and a New Radio (NR) function. From the perspective of interaction between a terminal and a base station, a control plane signaling is transmitted through the LTE base station; user plane data of the terminal, after being offloaded on the terminal side, is independently transmitted to the core network through an LTE air interface and an NR air interface respectively. As shown in FIG. 1B, which is a reference schematic diagram of an Option 7a architecture provided by an embodiment of the present application, wherein a network element of a 4G access network is an LTE eNB (4G base station), and a network element of a 5G access network is an NR gNB (5G base station); the LTE eNB acts as a Master Node (MN) in a Dual Connectivity (DC), and the NR gNB acts as a Secondary Node (SN) in the DC; there is an S1 interface between the LTE eNB and the NGC, it includes a control plane Interface (S1-C interface) and a user interface (S1-U interface); and there is only a user interface (S1-U interface) between the NR gNB and the NGC.

In embodiments of the present application, for the realization of the enhanced mobile broadband (eMBB, Enhance Mobile Broadband) function in 5G, both the NR access network and the LTE access network may be data offload paths. Since NGC is a 5G core network, its network configuration and indicators fully meet the requirements of 5G, and LTE is used as the carrier of the control plane and a supplement to the user plane. In this process, the UI display of the terminal's access technology should truly reflect the terminal's current network status and user scenarios. Specifically, in the case that the terminal has been attached to the LTE eNB and NR gNB and is in service mode, when the UE is in a static state, due to the complete link of UE NR gNB-9 NGC and the bandwidth of this link (an air interface and an interface of the core network) being much greater than the link bandwidth of UE→LTE eNB→NGC, in the case that the wireless resources of the two links meet requirements, the NR link will be preferred from the perspective of the UE.

Figure 2:
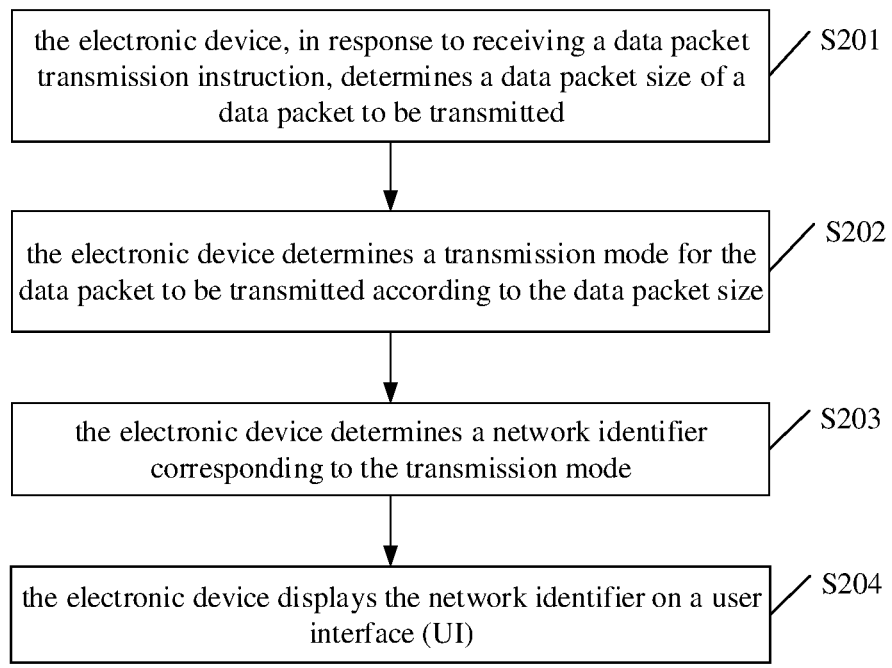
FIG. 2 is a schematic flow chart of a user interface (UI) display control method provided by an embodiment of the present application.

Referring to FIG. 2, FIG. 2 is a schematic flow chart of a user interface (UI) display control method provided by an embodiment of the present application. The method is applied in an electronic device, the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; as shown in the drawings, the user interface (UI) display control method comprises the following operations.

Operation 201, the electronic device, when receiving a data packet transmission instruction, determines a data packet size of a data packet to be transmitted.

In this embodiment, in data uploading and data downloading, the electronic device can receive data packet transmission instructions; data packets include video data packets, file data packets, photograph data packets, voice message data packets, and other data packets.

Operation 202, the electronic device determines a transmission mode for the data packet to be transmitted according to the data packet size.

In this embodiment, since the electronic device supports the dual-connection mode, there are many kinds of transmission policies. When performing data packet transmission, it is possible to transmit the data packet to be transmitted to the first network device through the first communication connection, or transmit the data packet to be transmitted to the second network device through the second communication connection, or transmit the data packet to be transmitted to the first network device and the second network device through the first communication connection and the second communication connection respectively. After determining the size of the data packet to be transmitted, a transmission mode for the data packet to be transmitted is determined according to the data packet size.

Operation 203, the electronic device determines a network identifier corresponding to the transmission mode.

In this embodiment, different transmission policies correspond to different network identifiers, the network identifiers are used to indicate a current network state of the electronic device and transmission policies of data packets to users. The network identifiers include a first network identifier and a second network identifier, the first network identifier is a 4G network identifier, and the second network identifier is a 5G network identifier.

Operation 204, the electronic device displays the network identifier on a user interface (UI).

It can be seen that in embodiments of the present application, when an electronic device receives a data packet transmission instruction, first, a data packet size of a data packet to be transmitted is determined; second, a transmission mode for the data packet to be transmitted is determined according to the data packet size; third, a network identifier corresponding to the transmission mode is determined; finally, the network identifier is displayed on a user interface (UI). It can be seen that during the process of transmitting the data packet, the electronic device determines a transmission mode for the data packet to be transmitted according to the data packet size of the data packet to be transmitted, and thus determines a network identifier corresponding to the transmission mode and displays the network identifier on a user interface (UI), for example, displays a first network identifier in a first transmission mode, and displays a second network identifier in a second transmission mode. In this way, an actual communication state of the electronic device during the transmission process of the data packet can be displayed accurately, intuitively, and comprehensively, and it is beneficial to improve comprehensiveness and accuracy of a network identifier of an electronic device in a data packet transmission scenario.

In a possible example, the determining a transmission mode for the data packet to be transmitted according to the data packet size comprises: determining a transmission time threshold value of the data packet to be transmitted; when detecting that the data packet size is less than a first threshold value, determining that a transmission mode for the data packet to be transmitted is a first transmission mode, wherein the first transmission mode is transmitting the data packet to be transmitted to the NGC through the first communication connection and the fourth communication connection within the transmission time threshold value.

In this embodiment, the transmission time threshold value of the data packet to be transmitted is determined, the transmission time threshold value is used to indicate completing transmission of the data packet to be transmitted within the transmission time threshold value.

In this embodiment, when detecting that the data packet size is less than the first threshold value, the transmission mode of the data packet to be transmitted is determined to be the first transmission mode. The first transmission mode is that: within the transmission time threshold value, the data packet to be transmitted is transmitted to a first network device through the first communication connection, and the first network device transmits the data packet to be transmitted to a new generation core network through the fourth communication connection, that is, the data packet is uploaded through LTE, and the transmission path is UE→LTE eNB→NGC.

It can be seen that in this example, when detecting that the data packet size is less than the first threshold value, the electronic device quickly determines adopting the first transmission mode to perform transmission of the data packet, so as to determine an adapted network identifier according to the first transmission mode, it is beneficial to improve accuracy and efficiency of displaying network identifiers.

In a possible example, the determining a transmission mode for the data packet to be transmitted according to the data packet size comprises: determining a transmission time threshold value of the data packet to be transmitted; when detecting that the data packet size is greater than a second threshold value, determining that a transmission mode for the data packet to be transmitted is a second transmission mode, wherein the first transmission mode is transmitting the data packet to be transmitted to the NGC through the second communication connection and the fifth communication connection within the transmission time threshold value, wherein the second threshold value is greater than the first threshold value.

In this embodiment, the transmission time threshold value of the data packet to be transmitted is determined, the transmission time threshold value is used to indicate completing transmission of the data packet to be transmitted within the transmission time threshold value.

In this embodiment, when detecting that the data packet size is greater than the second threshold value, the transmission mode of the data packet to be transmitted is determined to be the second transmission mode. The second transmission mode is that: within the transmission time threshold value, the data packet to be transmitted is transmitted to a second network device through the second communication connection, and the second network device transmits the data packet to be transmitted to a new generation core network through the fifth communication connection, that is, the data packet is uploaded through NR, and the transmission path is UE→NR gNB→NGC.

In this embodiment, the second threshold value is greater than the first threshold value, therefore, a data packet being less than the first threshold value corresponds to the first transmission mode, that is, the data packet is entirely transmitted through a 4G network; a data packet being greater than the second threshold value corresponds to the second transmission mode, that is, the data packet is entirely transmitted through a 5G network.

It can be seen that in this example, when detecting that the data packet size is greater than the second threshold value, the electronic device quickly determines adopting the second transmission mode to perform transmission of the data packet, so as to determine an adapted network identifier according to the second transmission mode, it is beneficial to improve accuracy and efficiency of displaying network identifiers.

In a possible example, the determining a transmission mode for the data packet to be transmitted according to the data packet size comprises: determining a transmission time threshold value of the data packet to be transmitted; when detecting that the data packet size is greater than the first threshold value but less than the second threshold value, splitting the data packet to be transmitted into a first data packet and a second data packet; and determining that a transmission mode for the data packet to be transmitted is a third transmission mode, wherein the third transmission mode includes transmitting the first data packet to the NGC through the first communication connection and the fourth communication connection and transmitting the second data packet to the NGC through the second communication connection and the fifth communication connection within the transmission time threshold value.

In this embodiment, when detecting that the data packet size is greater than the first threshold value but less than the second threshold value, that is, the data packet size is between the first threshold value and the second threshold value, the data packet can be split to obtain the first data packet and the second data packet; at this time, the transmission mode of the data packet to be transmitted is the third transmission mode.

In this embodiment, in the third transmission mode, the first data packet is transmitted to a first network device through the first communication connection, and then is transmitted to an NGC through the fourth communication connection by the first network device; the second data packet is transmitted to a second network device through the second communication connection, and then is transmitted to an NGC through the fifth communication connection by the second network device. That is, the data packet is transmitted through LTE and NR simultaneously, the transmission path of the first data packet is UE→LTE eNB→NGC, and the transmission path of the second data packet is UE→NR gNB→NGC.

It can be seen that in this example, when detecting that the data packet size is greater than the first threshold value but less than the second threshold value, the data packet is split, so that one part of the data packet can be transmitted through the first network device, and the other part can be transmitted through the second network device. Thus, the dual-connection mode is used effectively, and it is beneficial to improve data transmission efficiency.

In one possible example, the splitting the data packet to be transmitted into a first data packet and a second data packet comprises: obtaining a first data transmission speed corresponding to the first communication connection and a second data transmission speed corresponding to the second communication connection; determining a ratio of the first data transmission speed to the second data transmission speed; splitting the data packet to be transmitted into a first data packet and a second data packet according to the ratio, wherein the first data packet corresponds to the first data transmission speed, and the second data packet corresponds to the second data transmission speed.

In this embodiment, since the electronic device is capable of establishing the first communication connection with the first network device, and is capable of establishing the second communication connection with the second network device, the first data transmission speed corresponding to the first communication connection and the second data transmission speed corresponding to the second communication connection can be determined, and thus the ratio of the first data transmission speed to the second data transmission speed can be determined.

In this embodiment, when splitting the data packet, the data packet can be split into the first data packet and the second data packet according to the ratio, wherein the first data packet corresponds to the first data transmission speed, and the second data packet corresponds to the second data transmission speed.

It can be seen that in this example, the data packet is split into the first data packet and the second data packet according to the ratio of the first data transmission speed of the first communication connection to the second data transmission speed of the second communication connection, so that the first data packet is transmitted through the first communication connection and the second data packet is transmitted through the second communication connection, it is beneficial to improve data transmission efficiency.

In a possible example, the determining a network identifier corresponding to the transmission mode comprises: determining that a network identifier corresponding to the first transmission mode is a first network identifier, a network identifier corresponding to the second transmission mode is a second network identifier, and a network identifier corresponding to the third transmission mode is a first network identifier or a second network identifier.

In this embodiment, the first transmission mode corresponds to the first network identifier, that is, a 4G network identifier is displayed on a user interface (UI); the second transmission mode corresponds to the second network identifier, that is, a 5G network identifier is displayed on a user interface (UI); the third transmission mode corresponds to the first network identifier or the second network identifier, that is, a user interface (UI) may display a 4G network identifier and may also display a 5G network identifier.

It can be seen that in this example, different transmission policies of data packets correspond to different network identifiers. Therefore, after determining the transmission mode of the data packet to be transmitted according to the data packet size, according to the transmission mode, a network identifier of the data packet to be transmitted can be determined and then displayed on a user interface (UI).

In one possible example, the determining that a network identifier corresponding to the third transmission mode is a first network identifier or a second network identifier comprises: determining a size of the first data packet and a size of the second data packet; when detecting that the size of the first data packet is greater than the size of the second data packet, determining that a network identifier corresponding to the third transmission mode is the first network identifier; or when detecting that the size of the first data packet is less than the size of the second data packet, determining that a network identifier corresponding to the third transmission mode is the second network identifier.

In this embodiment, after the data packet to be transmitted in split into the first data packet and the second data packet, it is equivalent to perform diffluence for the data packet, and the specific diffluence proportion depends on a diffluence algorithm. The size of the first data packet and the size of the second data packet are determined, if the size of the first data packet is greater than the size of the second data packet, the network identifier is determined to be the first network identifier, that is, the user interface (UI) displays the 4G network identifier; if the size of the first data packet is less than the size of the second data packet, the network identifier is determined to be the second network identifier, that is, the user interface (UI) displays the 5G network identifier.

It can be seen that in this example, the first data packet and the second data packet are obtained by performing diffluence for the data packet, the first data packet is distributed to the first network device, and the second data packet is distributed to the second network device; according to the size of the first data packet and the size of the second data packet after diffluence, the network identifier corresponding to the third transmission mode is determined, and thus whether the user interface (UI) displays the first network identifier or the second network identifier can be determined.

In one possible example, the data packet to be transmitted is a game data packet, and the user interface (UI) is a game group battle interface; the displaying the network identifier on a user interface (UI) comprises: when detecting that the network identifier is the first network identifier, labeling the first network identifier with a first sign, such as a red sign, and preferably further highlighting the first network identifier; when detecting that the network identifier is the second network identifier, labeling the second network identifier with a second sign, such as a green sign.

In this embodiment, if the data packet to be transmitted is a game data packet, and the current user interface (UI) is a game group battle interface, when displaying the network identifier on the user interface (UI), the first network identifier is labeled with a first sign, such as a red sign, and the first network identifier is preferably highlighted when detecting that the network identifier is the first network identifier, and the second network identifier is labeled with a second sign, such as a green sign, when detecting that the network identifier is the second network identifier.

In this embodiment, when the network identifier is the first network identifier, it is indicated that the electronic device currently uses a 4G network, therefore it is possible to prompt a user of a current network state through a first sign, such as a red mark, and inform the user that quality of the current network state is not very good at the same time. When the network identifier is the second network identifier, it is indicated that the electronic device currently uses a 5G network, therefore it is possible to prompt a user of a current network state through a second sign, such as a green mark, and inform the user that quality of the current network state is good at the same time.

It can be seen that in this example, network identifiers are labeled with different colors, the first network identifier is labeled with a first sign, such as a red sign, and the second network identifier is labeled with a second sign, such as a green sign; by differentiated display, it is conducive for user to quickly observe a current network state, and whether the electronic device currently uses a 4G network or a 5G network.

In this possible example, the data packet to be transmitted is a game data packet, and the user interface (UI) is a game group battle interface; the displaying the network identifier on a user interface (UI) comprises: inquiring a correspondence relationship between a game application interface and a network identifier displaying position; determining a target displaying position for the network identifier corresponding to the user interface (UI) according to the preset correspondence relationship; and displaying the network identifier on the target displaying position.

In specifically implementation, the electronic device aims at different application interfaces of a game application, and the preset displaying position can be located at different positions. For example, for a game login interface, the network identifier can be displayed at an upper left corner of the interface; for a game group battle interface, the network identifier can be displayed at an upper middle position of the interface; and for a game shop interface, the network identifier can be displayed near a commodity presentation position, and so on. In some scenarios, the network identifier can be displayed in a main sight range of a user to be conducive for the user to observe the network identifier in real time. In some scenarios, the network identifier can be displayed out of a main sight range of a user to be conducive for the user to focus attention on game images.

It can be seen that in this example, specifically for different game application interfaces during game data packet transmission, the electronic device can flexibly adjust and adapt displaying positions of network identifiers of current game application interfaces, and thus improve flexibility and smart performance of displaying network identifiers in the electronic device.

Figure 3:
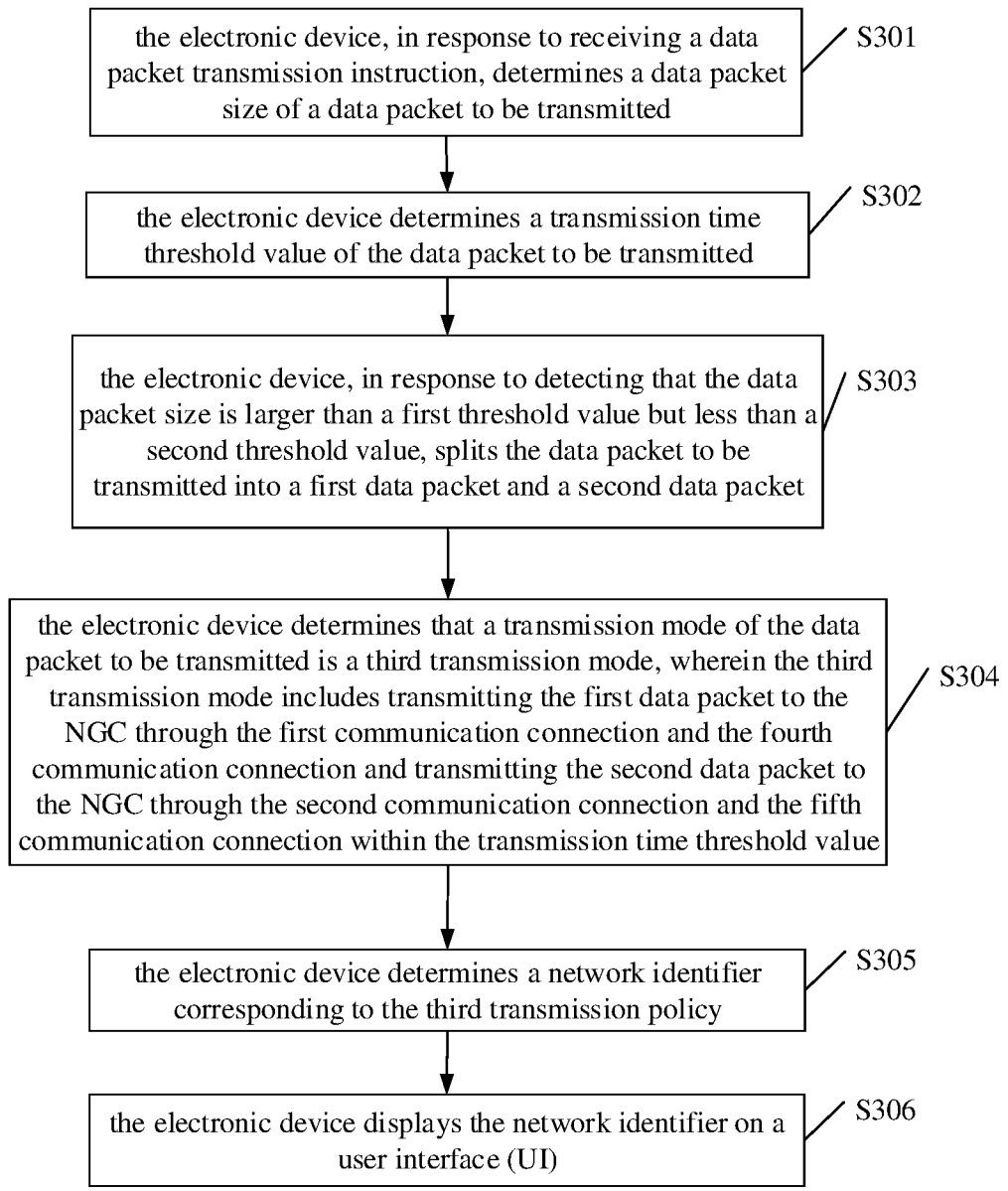
FIG. 3 is a schematic flow chart of another user interface (UI) display control method provided by an embodiment of the present application.

Similarly to the embodiment shown in above FIG. 2, referring to FIG. 3, FIG. 3 is a schematic flow chart of a user interface (UI) display control method provided by an embodiment of the present application. The method is applied in an electronic device, the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; as shown in the drawings, the user interface (UI) display control method comprises the following operations.

Operation 301, the electronic device, when receiving a data packet transmission instruction, determines a data packet size of a data packet to be transmitted.

Operation 302, the electronic device determines a transmission time threshold value of the data packet to be transmitted.

Operation 303, the electronic device, when detecting that the data packet size is greater than a first threshold value but less than a second threshold value, splits the data packet to be transmitted into a first data packet and a second data packet.

Operation 304, the electronic device determines that a transmission mode of the data packet to be transmitted is a third transmission mode, wherein the third transmission mode includes transmitting the first data packet to the NGC through the first communication connection and the fourth communication connection and transmitting the second data packet to the NGC through the second communication connection and the fifth communication connection within the transmission time threshold value.

Operation S305, the electronic device determines a network identifier corresponding to the third transmission mode.

Operation 306, the electronic device displays the network identifier on a user interface (UI).

It can be seen that in embodiments of the present application, when an electronic device receives a data packet transmission instruction, first, a data packet size of a data packet to be transmitted is determined; second, a transmission mode for the data packet to be transmitted is determined according to the data packet size; third, a network identifier corresponding to the transmission mode is determined; finally, the network identifier is displayed on a user interface (UI). It can be seen that during the process of transmitting the data packet, the electronic device determines a transmission mode for the data packet to be transmitted according to the data packet size of the data packet to be transmitted, and thus determines a network identifier corresponding to the transmission mode and displays the network identifier on a user interface (UI), for example, displays a first network identifier in a first transmission mode, and displays a second network identifier in a second transmission mode. In this way, an actual communication state of the electronic device during the transmission process of the data packet can be displayed accurately, intuitively, and comprehensively, and it is beneficial to improve comprehensiveness and accuracy of a network identifier of an electronic device in a data packet transmission scenario.

Furthermore, when detecting that the data packet size is greater than a first threshold value but less than a second threshold value, the data packet is split, so that one part of the data packet can be transmitted through the first network device, and the other part can be transmitted through the second network device. Thus, the dual-connection mode is used effectively, and it is beneficial to improve data transmission efficiency.

Figure 4:
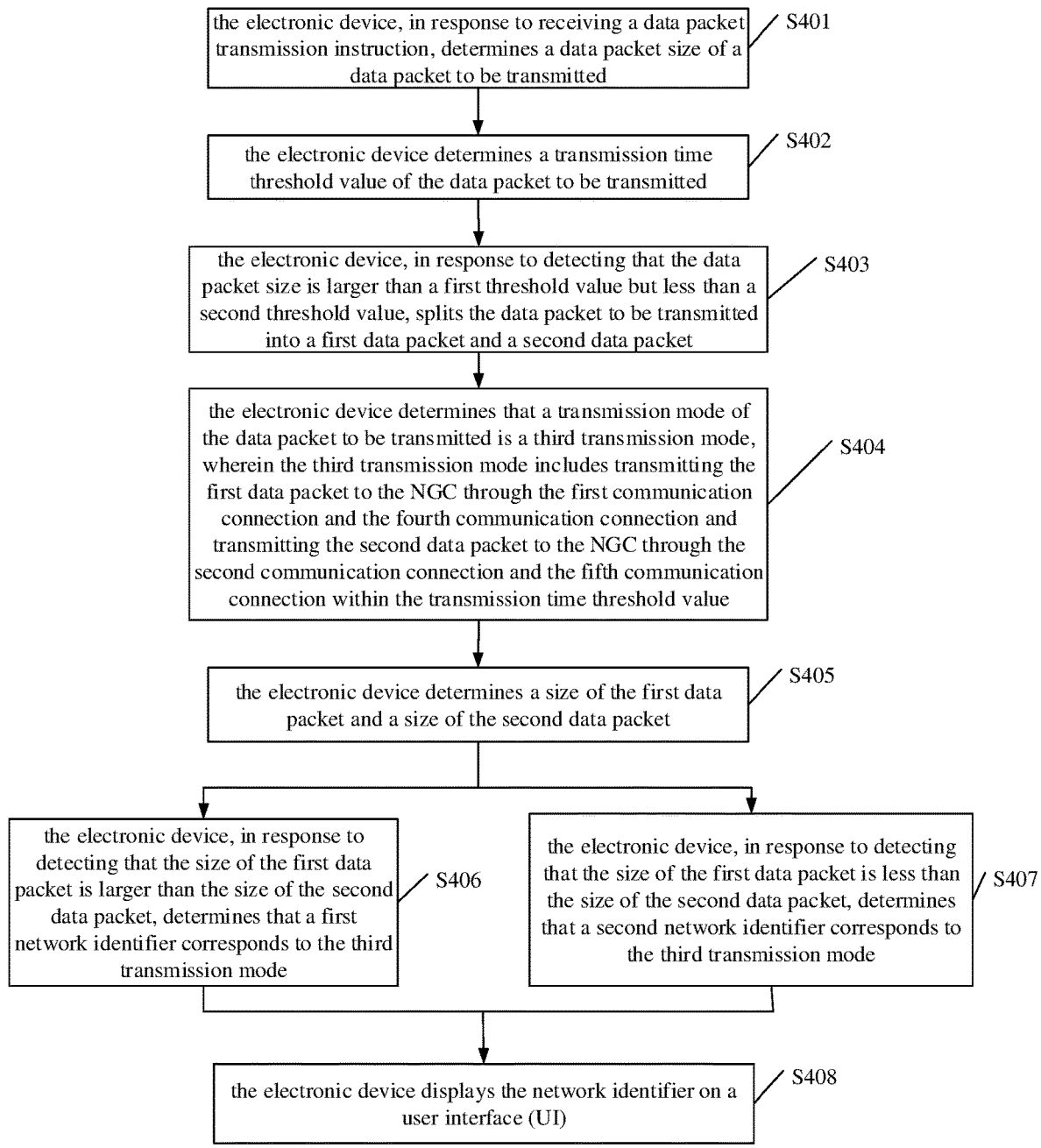
FIG. 4 is a schematic flow chart of another user interface (UI) display control method provided by an embodiment of the present application.

Similarly to the embodiments shown in above FIG. 2 and FIG. 3, referring to FIG. 4, FIG. 4 is a schematic flow chart of a user interface (UI) display control method provided by an embodiment of the present application. The method is applied in an electronic device, the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; as shown in the drawings, the user interface (UI) display control method comprises the following operations.

Operation 401, the electronic device, when receiving a data packet transmission instruction, determines a data packet size of a data packet to be transmitted.

Operation 402, the electronic device determines a transmission time threshold value of the data packet to be transmitted.

Operation 403, the electronic device, when detecting that the data packet size is greater than a first threshold value but less than a second threshold value, splits the data packet to be transmitted into a first data packet and a second data packet.

Operation 404, the electronic device determines that a transmission mode of the data packet to be transmitted is a third transmission mode, wherein the third transmission mode includes transmitting the first data packet to the NGC through the first communication connection and the fourth communication connection and transmitting the second data packet to the NGC through the second communication connection and the fifth communication connection within the transmission time threshold value.

Operation 405, the electronic device determines a size of the first data packet and a size of the second data packet.

Operation 406, the electronic device, when detecting that the size of the first data packet is greater than the size of the second data packet, determines that a network identifier corresponding to the third transmission mode is a first network identifier; or Operation 407, the electronic device, when detecting that the size of the first data packet is less than the size of the second data packet, determines that a network identifier corresponding to the third transmission mode is a second network identifier.

Operation 408, the electronic device displays the network identifier on a user interface (UI).

It can be seen that in embodiments of the present application, when an electronic device receives a data packet transmission instruction, first, a data packet size of a data packet to be transmitted is determined; second, a transmission mode for the data packet to be transmitted is determined according to the data packet size; third, a network identifier corresponding to the transmission mode is determined; finally, the network identifier is displayed on a user interface (UI). It can be seen that during the process of transmitting the data packet, the electronic device determines a transmission mode for the data packet to be transmitted according to the data packet size of the data packet to be transmitted, and thus determines a network identifier corresponding to the transmission mode and displays the network identifier on a user interface (UI), for example, displays a first network identifier in a first transmission mode, and displays a second network identifier in a second transmission mode. In this way, an actual communication state of the electronic device during the transmission process of the data packet can be displayed accurately, intuitively, and comprehensively, and it is beneficial to improve comprehensiveness and accuracy of a network identifier of an electronic device in a data packet transmission scenario.

Furthermore, when detecting that the data packet size is greater than the first threshold value but less than the second threshold value, the data packet is split, so that one part of the data packet can be transmitted through the first network device, and the other part can be transmitted through the second network device. Thus, the dual-connection mode is used effectively, and it is beneficial to improve data transmission efficiency.

Furthermore, the first data packet and the second data packet are obtained by performing diffluence for the data packet, the first data packet is distributed to the first network device, and the second data packet is distributed to the second network device; according to the size of the first data packet and the size of the second data packet after diffluence, the network identifier corresponding to the third transmission mode is determined, and thus whether the user interface (UI) displays the first network identifier or the second network identifier can be determined.

Figure 5:
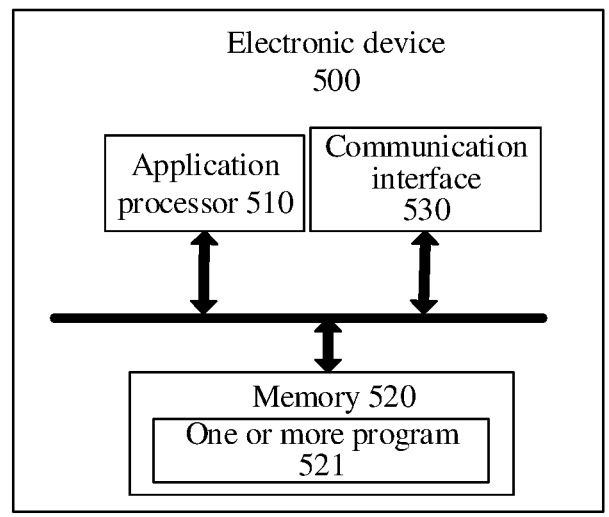
FIG. 5 is a structural schematic diagram of an electronic device provided by an embodiment of the present application.

Similarly to the embodiments shown in above FIG. 2, FIG. 3 and FIG. 4, referring to FIG. 5, FIG. 5 is a structural schematic view of an electronic device 500 provided by an embodiment of the present application. As shown in the drawings, the electronic device 500 supports a dual-connection mode, the dual-connection mode is that the electronic device 500 is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC. The electronic device 500 comprises an application processor 510, a memory 520, a communication interface 530, and one or more program 521; wherein, the one or more program 521 is stored in the memory 520 and configured to be executed by the application processor 510, the one or more program 521 includes instructions configured to execute the following operations: determining a data packet size of a data packet to be transmitted when a data packet transmission instruction is received; determining a transmission mode for the data packet to be transmitted according to the data packet size; determining a network identifier corresponding to the transmission mode; and displaying the network identifier on a user interface (UI).

It can be seen that in embodiments of the present application, when an electronic device receives a data packet transmission instruction, first, a data packet size of a data packet to be transmitted is determined; second, a transmission mode for the data packet to be transmitted is determined according to the data packet size; third, a network identifier corresponding to the transmission mode is determined; finally, the network identifier is displayed on a user interface (UI). It can be seen that during the process of transmitting the data packet, the electronic device determines a transmission mode for the data packet to be transmitted according to the data packet size of the data packet to be transmitted, and thus determines a network identifier corresponding to the transmission mode and displays the network identifier on a user interface (UI), for example, displays a first network identifier in a first transmission mode, and displays a second network identifier in a second transmission mode. In this way, an actual communication state of the electronic device during the transmission process of the data packet can be displayed accurately, intuitively, and comprehensively, and it is beneficial to improve comprehensiveness and accuracy of a network identifier of an electronic device in a data packet transmission scenario.

In one possible example, in the aspect of determining a transmission mode for the data packet to be transmitted according to the data packet size, the instructions in the program are specifically configured to execute the following operations: determining a transmission time threshold value of the data packet to be transmitted; when detecting that the data packet size is less than a first threshold value, determining that a transmission mode for the data packet to be transmitted is a first transmission mode, wherein the first transmission mode is transmitting the data packet to be transmitted to the NGC through the first communication connection and the fourth communication connection within the transmission time threshold value.

In one possible example, in the aspect of determining a transmission mode for the data packet to be transmitted according to the data packet size, the instructions in the program are specifically configured to execute the following operations: determining a transmission time threshold value of the data packet to be transmitted; when detecting that the data packet size is greater than a second threshold value, determining that a transmission mode for the data packet to be transmitted is a second transmission mode, wherein the first transmission mode is transmitting the data packet to be transmitted to the NGC through the second communication connection and the fifth communication connection within the transmission time threshold value, wherein the second threshold value is greater than the first threshold value.

In one possible example, in the aspect of determining a transmission mode for the data packet to be transmitted according to the data packet size, the instructions in the program are specifically configured to execute the following operations: determining a transmission time threshold value of the data packet to be transmitted; when detecting that the data packet size is greater than the first threshold value but less than the second threshold value, splitting the data packet to be transmitted into a first data packet and a second data packet; and determining that a transmission mode for the data packet to be transmitted is a third transmission mode, wherein the third transmission mode includes transmitting the first data packet to the NGC through the first communication connection and the fourth communication connection and transmitting the second data packet to the NGC through the second communication connection and the fifth communication connection within the transmission time threshold value.

In one possible example, in the aspect of splitting the data packet to be transmitted into a first data packet and a second data packet, the instructions in the program are specifically configured to execute the following operations: obtaining a first data transmission speed corresponding to the first communication connection and a second data transmission speed corresponding to the second communication connection; determining a ratio of the first data transmission speed to the second data transmission speed; splitting the data packet to be transmitted into a first data packet and a second data packet according to the ratio, wherein the first data packet corresponds to the first data transmission speed, and the second data packet corresponds to the second data transmission speed.

In one possible example, in the aspect of determining a network identifier corresponding to the transmission mode, the instructions in the program are specifically configured to execute the following operations: determining that a network identifier corresponding to the first transmission mode is a first network identifier, a network identifier corresponding to the second transmission mode is a second network identifier, and a network identifier corresponding to the third transmission mode is a first network identifier or a second network identifier.

In one possible example, the first network identifier is a 4G network identifier, and the second network identifier is a 5G network identifier.

In one possible example, in the aspect of determining that a network identifier corresponding to the third transmission mode is a first network identifier or a second network identifier, the instructions in the program are specifically configured to execute the following operations: determining a size of the first data packet and a size of the second data packet; when detecting that the size of the first data packet is greater than the size of the second data packet, determining that a network identifier corresponding to the third transmission mode is the first network identifier; or when detecting that the size of the first data packet is less than the size of the second data packet, determining that a network identifier corresponding to the third transmission mode is the second network identifier.

In one possible example, the data packet to be transmitted is a game data packet, and the user interface (UI) is a game group battle interface; in the aspect of displaying the network identifier on a user interface (UI), the instructions in the program are specifically configured to execute the following operations: when detecting that the network identifier is the first network identifier, labeling the first network identifier with red and highlighting the first network identifier; when detecting that the network identifier is the second network identifier, labeling the second network identifier with green.

The foregoing mainly introduces solutions of embodiments of the present application from the perspective of the execution process on the method side. It can be understood that, in order to implement the above-mentioned functions, an electronic device includes hardware structures and/or software modules corresponding to each function. Those skilled in the art should easily realize that in combination with the units and algorithm steps of the examples described in the embodiments provided herein, the present application can be implemented in the form of hardware or a combination of hardware and computer software. Whether a function is executed by hardware or computer software driving hardware depends on specific application and design constraints of a technical solution. Those skilled in the art can use different methods for each specific application to implement the described functions, but such implementation should not be considered as being beyond the scope of the present application.

Embodiments of the present application may divide the electronic device into functional units according to the foregoing method examples. For example, each functional unit may be divided corresponding to each function, or two or more functions may also be integrated into one processing unit. The above-mentioned integrated unit can be realized in the form of hardware, and can also be realized in the form of software functional units. It should be noted that the division of units in the embodiments of the present application is illustrative and is only a logical function division, and there may be other division methods in actual implementation.

Figure 6:
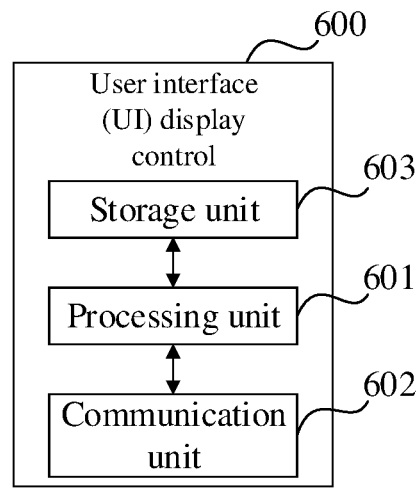
FIG. 6 is a forming diagram of functional units of a user interface (UI) display control apparatus provided by an embodiment of the present application.

FIG. 6 is a forming diagram of functional units of a user interface (UI) display control apparatus 600 involved by an embodiment of the present application. The user interface (UI) display control apparatus 600 is applied in an electronic device, the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) notstand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the user interface (UI) display control apparatus 600 comprises a processing unit 601 and a communication unit 602, wherein the processing unit 601 is configured to determine a data packet size of a data packet to be transmitted when a data packet transmission instruction is received through the communication unit 602; and configured to determine a transmission mode for the data packet to be transmitted according to the data packet size; and configured to determine a network identifier corresponding to the transmission mode; and configured to display the network identifier on a user interface (UI).

In this embodiment, the user interface (UI) display control apparatus 600 can further comprise a storage unit 603 configured to store program codes and data of the electronic device. The processing unit 601 can be a processor, the communication unit 602 can be a touch control display screen or a transceiver, and the storage unit 603 can be a memory.

It can be seen that in embodiments of the present application, when an electronic device receives a data packet transmission instruction, first, a data packet size of a data packet to be transmitted is determined; second, a transmission mode for the data packet to be transmitted is determined according to the data packet size; third, a network identifier corresponding to the transmission mode is determined; finally, the network identifier is displayed on a user interface (UI). It can be seen that during the process of transmitting the data packet, the electronic device determines a transmission mode for the data packet to be transmitted according to the data packet size of the data packet to be transmitted, and thus determines a network identifier corresponding to the transmission mode and displays the network identifier on a user interface (UI), for example, displays a first network identifier in a first transmission mode, and displays a second network identifier in a second transmission mode. In this way, an actual communication state of the electronic device during the transmission process of the data packet can be displayed accurately, intuitively, and comprehensively, and it is beneficial to improve comprehensiveness and accuracy of a network identifier of an electronic device in a data packet transmission scenario.

In one possible example, in the aspect of determining a transmission mode for the data packet to be transmitted according to the data packet size, the processing unit 601 is specifically configured to: determine a transmission time threshold value of the data packet to be transmitted; when detecting that the data packet size is less than a first threshold value, determine that a transmission mode for the data packet to be transmitted is a first transmission mode, wherein the first transmission mode is transmitting the data packet to be transmitted to the NGC through the first communication connection and the fourth communication connection within the transmission time threshold value.

In one possible example, in the aspect of determining a transmission mode for the data packet to be transmitted according to the data packet size, the processing unit 601 is specifically configured to: determine a transmission time threshold value of the data packet to be transmitted; when detecting that the data packet size is greater than a second threshold value, determine that a transmission mode for the data packet to be transmitted is a second transmission mode, wherein the first transmission mode is transmitting the data packet to be transmitted to the NGC through the second communication connection and the fifth communication connection within the transmission time threshold value; wherein the second threshold value is greater than the first threshold value.

In one possible example, in the aspect of determining a transmission mode for the data packet to be transmitted according to the data packet size, the processing unit 601 is specifically configured to: determine a transmission time threshold value of the data packet to be transmitted; when detecting that the data packet size is greater than the first threshold value but less than the second threshold value, split the data packet to be transmitted into a first data packet and a second data packet; and determine that a transmission mode for the data packet to be transmitted is a third transmission mode, wherein the third transmission mode includes transmitting the first data packet to the NGC through the first communication connection and the fourth communication connection and transmitting the second data packet to the NGC through the second communication connection and the fifth communication connection within the transmission time threshold value.

In one possible example, in the aspect of splitting the data packet to be transmitted into a first data packet and a second data packet, the processing unit 601 is specifically configured to: obtain a first data transmission speed corresponding to the first communication connection and a second data transmission speed corresponding to the second communication connection; determine a ratio of the first data transmission speed to the second data transmission speed; split the data packet to be transmitted into a first data packet and a second data packet according to the ratio, wherein the first data packet corresponds to the first data transmission speed, and the second data packet corresponds to the second data transmission speed.

In one possible example, in the aspect of determining a network identifier corresponding to the transmission mode, the processing unit 601 is specifically configured to: determine that a network identifier corresponding to the first transmission mode is a first network identifier, a network identifier corresponding to the second transmission mode is a second network identifier, and a network identifier corresponding to the third transmission mode is a first network identifier or a second network identifier.

In one possible example, the first network identifier is a 4G network identifier, and the second network identifier is a 5G network identifier.

In one possible example, in the aspect of determining that a network identifier corresponding to the third transmission mode is a first network identifier or a second network identifier, the processing unit 601 is specifically configured to: determine a size of the first data packet and a size of the second data packet; when detecting that the size of the first data packet is greater than the size of the second data packet, determine that a network identifier corresponding to the third transmission mode is the first network identifier; or when detecting that the size of the first data packet is less than the size of the second data packet, determine that a network identifier corresponding to the third transmission mode is the second network identifier.

In one possible example, the data packet to be transmitted is a game data packet, and the user interface (UI) is a game group battle interface; in the aspect of displaying the network identifier on a user interface (UI), the processing unit 601 is specifically configured to: when detecting that the network identifier is the first network identifier, label the first network identifier with red and highlight the first network identifier; when detecting that the network identifier is the second network identifier, label the second network identifier with green.

An embodiment of the present application further provides a computer storage medium, wherein the computer readable storage medium stores a computer program configured for electronic data exchange, wherein the computer program enables a computer to execute some or all operations of any method as described in the aforesaid method embodiment, and the computer comprises an electronic device.

An embodiment of the present application further provides a computer program product, wherein the computer program product comprises a non-transitory computer readable storage medium storing a computer program, the computer program can be operated to enable a computer to execute some or all operations of any method as described in the aforesaid method embodiment. The computer program product can be a software installation packet, and the computer comprises an electronic device.

It should be noted that for the foregoing method embodiments, for the sake of simple description, they are all expressed as a series of action combinations, but those skilled in the art should know that the present application is not limited by the described sequence of actions. Because according to the present application, some steps can be performed in other sequences or simultaneously. Secondly, those skilled in the art should also know that the embodiments described in the specification are all preferred embodiments, and the involved actions and modules are not necessarily required by the present application.

In the above-mentioned embodiments, the description of each embodiment has its own emphasis. For parts that are not described in detail in an embodiment, reference may be made to related descriptions of other embodiments.

In the several embodiments provided in the present application, it should be understood that the disclosed device may be implemented in other ways. For example, the device embodiments described above are merely illustrative. For example, the division of the above-mentioned units is only a logical function division, and there may be other divisions in actual implementation, for example, multiple units or components can be combined or integrated into another system, or some features can be ignored or not implemented. In addition, the displayed or discussed mutual coupling, or direct coupling, or communication connection may be indirect coupling or communication connection through some interfaces, devices or units, and may be in electrical or other forms.

The above units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit. The above-mentioned integrated unit can be realized in the form of hardware, and can also be realized in the form of software functional unit.

If the above integrated unit is implemented in the form of a software functional unit and sold or used as an independent product, it can be stored in a computer readable memory. Based on this understanding, the technical solution of the present application essentially, or the parts that contributes to the existing technology, or all or a part of the technical solution can be embodied in the form of a software product. The computer software product is stored in a memory and includes a plurality of instructions configured to enable a computer device (which may be a personal computer, a server, or a network device, etc.) to execute all or some of the operations of the foregoing methods of the various embodiments of the present application. The aforementioned memory includes various media that can store program codes, such as a U-disk, a read-only memory (ROM), a random access memory (RAM), a mobile hard disk, a magnetic disk, or an optical disk.

Those of ordinary skill in the art can understand that all or some of the operations in the various methods of the above-mentioned embodiments can be completed by instructing relevant hardware using a program. The program can be stored in a computer-readable memory, and the memory can include: a flash disk, a read-only memory (abbreviated as: ROM), a random access memory (abbreviated as: RAM), a magnetic disk or an optical disk, etc.

Embodiments of the present application are introduced in detail above. Specific examples are used herein to illustrate principle and implementation of the present application. The description of the above embodiments is only used to help understand the methods and core ideas of the present application; at the same time, for those skilled in the art, according to the ideas of the present application, there can be changes in specific embodiments and application scopes. In summary, the content of this specification should not be construed as any limitation to the present application.

What is claimed is:

1. A method of user interface (UI) display control applied in an electronic device; wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the method comprises:
 determining a data packet size of a data packet to be transmitted in response to receiving a data packet transmission instruction;
 determining a transmission mode for the data packet to be transmitted according to the data packet size, comprising:
  determining that the transmission mode for the data packet to be transmitted is a first transmission mode in response to detecting that the data packet size is less than a first threshold value;
  determining that the transmission mode for the data packet to be transmitted is a second transmission mode in response to detecting that the data packet size is greater than a second threshold value; and
  determining that the transmission mode for the data packet to be transmitted is a third transmission mode in response to detecting that the data packet size is greater than the first threshold value and less than the second threshold value;
 determining a network identifier corresponding to the transmission mode; and
 displaying the network identifier on a user interface (UI).

2. The method according to claim 1, wherein determining the transmission mode for the data packet to be transmitted according to the data packet size further comprises:
 determining a transmission time threshold value of the data packet to be transmitted, wherein the first transmission mode is transmitting the data packet to be transmitted to the NGC through the first communication connection and the fourth communication connection within the transmission time threshold value.

3. The method according to claim 1, wherein determining the transmission mode for the data packet to be transmitted according to the data packet size further comprises:
 determining a transmission time threshold value of the data packet to be transmitted, wherein the second transmission mode is transmitting the data packet to be transmitted to the NGC through the second communication connection and the fifth communication connection within the transmission time threshold value; wherein the second threshold value is greater than the first threshold value.

4. The method according to claim 1, wherein determining the transmission mode for the data packet to be transmitted according to the data packet size further comprises:
 determining a transmission time threshold value of the data packet to be transmitted; and
 splitting the data packet to be transmitted into a first data packet and a second data packet in response to detecting that the data packet size is greater than the first threshold value and less than the second threshold value, wherein the third transmission mode is transmitting the first data packet to the NGC through the first communication connection and the fourth communication connection and transmitting the second data packet to the NGC through the second communication connection and the fifth communication connection within the transmission time threshold value.

5. The method according to claim 4, wherein splitting the data packet to be transmitted into the first data packet and the second data packet comprises:
 obtaining a first data transmission speed corresponding to the first communication connection and a second data transmission speed corresponding to the second communication connection;
 determining a ratio of the first data transmission speed to the second data transmission speed; and
 splitting the data packet to be transmitted into a first data packet and a second data packet according to the ratio, wherein the first data packet corresponds to the first data transmission speed, and the second data packet corresponds to the second data transmission speed.

6. The method according to claim 1, wherein determining the network identifier corresponding to the transmission mode comprises:
 determining that a first network identifier corresponds to the first transmission mode, a second network identifier corresponds to the second transmission mode, and a first network identifier or a second network identifier corresponds to the third transmission mode.

7. The method according to claim 6, wherein the first network identifier is a 4G network identifier, and the second network identifier is a 5G network identifier.

8. The method according to claim 6, wherein determining that the first network identifier or the second network identifier corresponds to the third transmission mode comprises:
 determining a size of the first data packet and a size of the second data packet;
 determining that the first network identifier corresponds to the third transmission mode in response to detecting that the size of the first data packet is greater than the size of the second data packet; or
 determining that the second network identifier corresponds to the third transmission mode in response to detecting that the size of the first data packet is less than the size of the second data packet.

9. The method according to claim 1, wherein the data packet to be transmitted is a game data packet, the user interface (UI) is a game group battle interface, and displaying the network identifier on the user interface (UI) comprises:
 labeling the first network identifier with a first sign in response to detecting that the network identifier is the first network identifier; and labeling the second network identifier with a second sign in response to detecting that the network identifier is the second network identifier.

10. The method according to claim 1, wherein the data packet to be transmitted is a game data packet, the user interface (UI) is a game application interface, and displaying the network identifier on the user interface (UI) comprises:
inquiring a preset correspondence relationship between a game application interface and a network identifier displaying position;
determining a target displaying position for the network identifier corresponding to the user interface (UI) according to the preset correspondence relationship; and
displaying the network identifier on the target displaying position.

11. An electronic device, wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the electronic device comprises a processor, a memory, a communication interface, and one or more program;
wherein the one or more program is stored in the memory and configured to be executed by the processor, and the one or more program comprises instructions configured to execute the following operations:
determining a data packet size of a data packet to be transmitted in response to receiving a data packet transmission instruction;
determining a transmission mode for the data packet to be transmitted according to the data packet size, comprising:
determining that the transmission mode for the data packet to be transmitted is a first transmission mode in response to detecting that the data packet size is less than a first threshold value;
determining that the transmission mode for the data packet to be transmitted is a second transmission mode in response to detecting that the data packet size is greater than a second threshold value; and
determining that the transmission mode for the data packet to be transmitted is a third transmission mode in response to detecting that the data packet size is greater than the first threshold value and less than the second threshold value;
determining a network identifier corresponding to the transmission mode; and
displaying the network identifier on a user interface (UI).

12. The electronic device according to claim 11, wherein determining the transmission mode for the data packet to be transmitted according to the data packet size further comprises:
determining a transmission time threshold value of the data packet to be transmitted, wherein the first transmission mode is transmitting the data packet to be transmitted to the NGC through the first communication connection and the fourth communication connection within the transmission time threshold value.

13. The electronic device according to claim 11, wherein determining the transmission mode for the data packet to be transmitted according to the data packet size further comprises:
determining a transmission time threshold value of the data packet to be transmitted, wherein the second transmission mode is transmitting the data packet to be transmitted to the NGC through the second communication connection and the fifth communication connection within the transmission time threshold value; wherein the second threshold value is greater than the first threshold value.

14. The electronic device according to claim 11, wherein determining the transmission mode for the data packet to be transmitted according to the data packet size further comprises:
determining a transmission time threshold value of the data packet to be transmitted; and
splitting the data packet to be transmitted into a first data packet and a second data packet in response to detecting that the data packet size is greater than the first threshold value and less than the second threshold value, wherein the third transmission mode is transmitting the first data packet to the NGC through the first communication connection and the fourth communication connection and transmitting the second data packet to the NGC through the second communication connection and the fifth communication connection within the transmission time threshold value.

15. The electronic device according to claim 14, wherein splitting the data packet to be transmitted into the first data packet and the second data packet comprises:
obtaining a first data transmission speed corresponding to the first communication connection and a second data transmission speed corresponding to the second communication connection;
determining a ratio of the first data transmission speed to the second data transmission speed; and
splitting the data packet to be transmitted into a first data packet and a second data packet according to the ratio, wherein the first data packet corresponds to the first data transmission speed, and the second data packet corresponds to the second data transmission speed.

16. The electronic device according to claim 15, wherein determining the network identifier corresponding to the transmission mode comprises:
determining that a first network identifier corresponds to the first transmission mode, a second network identifier corresponds to the second transmission mode, and a first network identifier or a second network identifier corresponds to the third transmission mode.

17. The electronic device according to claim 16, wherein the first network identifier is a 4G network identifier, and the second network identifier is a 5G network identifier.

18. The electronic device according to claim 16, wherein determining that the first network identifier or the second network identifier corresponds to the third transmission mode comprises:
determining a size of the first data packet and a size of the second data packet;

determining that the first network identifier corresponds to the third transmission mode in response to detecting that the size of the first data packet is greater than the size of the second data packet; or determining that the second network identifier corresponds to the third transmission mode in response to detecting that the size of the first data packet is less than the size of the second data packet.

19. The electronic device according to claim 11, wherein the data packet to be transmitted is a game data packet, the user interface (UI) is a game group battle interface, and displaying the network identifier on the user interface (UI) comprises:

labeling the first network identifier with a first sign in response to detecting that the network identifier is the first network identifier; and labeling the second network identifier with a second sign in response to detecting that the network identifier is the second network identifier.

20. A non-transitory computer readable storage medium storing a computer program configured for electronic data exchange, wherein the computer program enables a computer to execute a user interface (UI) display control method applied in an electronic device; wherein the electronic device supports a dual-connection mode, the dual-connection mode is that the electronic device is capable of establishing a first communication connection with a first network device, and is capable of establishing a second communication connection with a second network device; the first network device and the second network device are network devices in a fifth generation (5G) not-stand alone (NSA) network, and the first network device is a fourth generation (4G) base station eNB, the second network device is a fifth generation (5G) base station gNB, and a core network of the NSA network is a new generation core network (NGC); the first network device is capable of establishing a third communication connection with the second network device, the first network device is capable of establishing a fourth communication connection with the NGC, and the second network device is capable of establishing a fifth communication connection with the NGC; the method comprises:

determining a data packet size of a data packet to be transmitted in response to receiving a data packet transmission instruction;

determining a transmission mode for the data packet to be transmitted according to the data packet size, comprising:

determining that the transmission mode for the data packet to be transmitted is a first transmission mode in response to detecting that the data packet size is less than a first threshold value;

determining that the transmission mode for the data packet to be transmitted is a second transmission mode in response to detecting that the data packet size is greater than a second threshold value; and determining that the transmission mode for the data packet to be transmitted is a third transmission mode in response to detecting that the data packet size is greater than the first threshold value and less than the second threshold value;

determining a network identifier corresponding to the transmission mode; and displaying the network identifier on a user interface (UI).

* * * * *